(12) United States Patent  
Odate

(10) Patent No.: US 7,481,460 B2  
(45) Date of Patent: Jan. 27, 2009

(54) VEHICLE SEAT BELT DEVICE

(75) Inventor: Shotaro Odate, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 10 days.

(21) Appl. No.: 11/557,331

(22) Filed: Nov. 7, 2006

(65) Prior Publication Data

US 2007/0102915 A1      May 10, 2007

(30) Foreign Application Priority Data

Nov. 9, 2005      (JP) .............................. 2005-325156

(51) Int. Cl.  
    *B60R 22/36* (2006.01)
(52) U.S. Cl. .................................................... 280/806
(58) Field of Classification Search ................ 280/806, 280/807, 801.1; 180/268; 297/480; 701/36, 701/45

See application file for complete search history.

(56) References Cited

U.S. PATENT DOCUMENTS 6,485,057 B1 *  11/2002  Midorikawa et al. ........ 280/807

2007/0018445 A1 *  1/2007  Inuzuka et al. .............. 280/806

FOREIGN PATENT DOCUMENTS

| JP | 2000-006759 | 1/2000 |
| JP | 2004-276896 | 10/2004 |

* cited by examiner

*Primary Examiner*—Faye M. Fleming  
(74) *Attorney, Agent, or Firm*—Rankin, Hill & Clark LLP

(57) ABSTRACT

A vehicle seat belt device includes an electric motor for retracting a loose portion of a seat belt during an emergency in a vehicle, and a control unit for controlling the electric motor. The control unit causes the electric motor to continuously rotate only in a belt retraction direction and repeatedly alternate between low-speed rotation and high-speed rotation when an emergency condition of the vehicle is predicted. The belt tension is varied by the repeated changing of the rotational speed between high speed and low speed, and the seat belt therefore vibrates. An occupant can be alerted to a predicted emergency by this vibration.

4 Claims, 10 Drawing Sheets

MOTOR DRIVE SIGNAL (DRIVE CURRENT)

BELT TENSION Btr

VEHICLE SEAT BELT DEVICE

FIELD OF THE INVENTION

The present invention relates to a vehicle seat belt device that utilizes a seat belt to restrain an occupant who is seated in a seat of a vehicle.

BACKGROUND OF THE INVENTION

Progress has been made in recent years in the development of vehicles that are equipped with a seat belt device for protecting a vehicle occupant. Some vehicle seat belt devices are provided with a pretensioner for rapidly retracting a loose portion of the seat belt in emergency situations. A type of vehicle seat belt device in which the seat belt is vibrated in order to warn the occupant of an anticipated emergency condition in the vehicle is known as a technique for increasing occupant protection (see JP-A-2000-6759 and JP-A-2004-276896).

The vehicle seat belt device described in JP-A-2000-6759 or JP-A-2004-276896 is provided with an electric motor for retracting the loose portion of a seat belt during a vehicle emergency. When an emergency condition in the vehicle is predicted, the operation of the electric motor is intermittently repeated to cause forward rotation or backward rotation.

The seat belt is retracted when the electric motor rotates forward, and the tension of the belt therefore increases. The seat belt is unwound when the electric motor rotates backward, and the tension of the belt therefore decreases. Intermittently repeating the increase and decrease in belt tension causes the seat belt to vibrate with a constant force. A belt vibration can thus be used to alert an occupant and call the occupant's attention by intermittently tightening and loosening the level of restraint exerted on the occupant by the seat belt.

The restraining force of the seat belt experienced by the seated occupant varies according to the state of the occupant (occupant's body position, the type or thickness of clothing, and other characteristics) or the effect of the looseness of the seat belt, and "deviation" therefore occurs. The occupant can therefore feel that the restraining force is too small or too great when an emergency is predicted. When the restraining force felt by the occupant is too great, the rapid tightening of the seat belt that occurs each time an emergency condition is predicted is uncomfortable to the occupant. It is also difficult for the occupant to notice the vibration of the seat belt when the restraining force felt by the occupant is too small. The same is true when the seat belt is loose at the time an emergency condition is predicted. The restraining force felt by the occupant is more preferably optimized at all times in the prediction stage.

Furthermore, even when the restraining force felt by the occupant is appropriate, the occupant feels the impact of the seat belt when the momentary change in restraining force that accompanies belt vibration is sudden. Such a sensation of impact is irritating to the occupant, and should therefore be made smaller. When there is "deviation" in the momentary change in restraining force, the magnitude of the irritation felt by the occupant also changes. The change in the level of irritation should also preferably be small.

A potential therefore exists for improvement in order to call the attention of an occupant by imparting a belt vibration that is more suitable to the occupant.

There is therefore a need for a technique that is capable of more reliably alerting an occupant and eliminating the discomfort associated with the alert by vibrating a seat belt in a stage in which a vehicle emergency condition is predicted, regardless of the state of the occupant (occupant's body position, the type or thickness of clothing, and other characteristics) or the looseness of the seat belt. There is also a need for a technique whereby the occupant's attention can be called by imparting a more suitable belt vibration to the occupant.

SUMMARY OF THE INVENTION

According to a first aspect of the present invention, there is provided a vehicle seat belt device comprising: a seat belt for restraining an occupant who is seated in a seat of a vehicle; a pretensioner for retracting a loose portion of the seat belt during an emergency; an electric motor for driving the pretensioner; and a control unit for controlling the electric motor, wherein the control unit performs control for causing the electric motor to continuously rotate only in a belt retraction direction and repeatedly alternate between low-speed rotation and high-speed rotation when an emergency condition of the vehicle is predicted.

The control unit can therefore cause the electric motor to continuously rotate in the belt retraction direction and repeatedly alternate between low-speed rotation (including an extremely small rotational speed) and high-speed rotation when an emergency condition is predicted in the vehicle. The retraction speed of the seat belt therefore fluctuates. As a result, since there is fluctuation in the degree to which the belt tension is increased by the retracting action, the seat belt vibrates. This vibration can be used to alert and call the attention of the occupant to a predicted emergency condition. The belt tension also increases gradually (in stages, or steadily). As the belt tension gradually increases, the restraining force of the seat belt felt by the occupant himself also gradually increases. When an emergency condition is predicted, the restraining force gradually increases even when the apparent restraining force is too small, or the seat belt is loose. The occupant can therefore quickly take notice of the vibration of the seat belt. The occupant can thus be more reliably alerted.

Presetting the drive torque generated by the electric motor at the time of prediction to a small value makes it possible to have a weak vibration of the belt when the prediction is first made, and then to gradually increase the vibration.

The discomfort imparted to the occupant by the belt vibration alert can thereby be eliminated.

The occupant can thus be more reliably alerted, the discomfort of the alert can be eliminated, and the comfort of the occupant can be maintained by vibrating the seat belt in the prediction stage regardless of the state of the occupant (occupant's body position, the type or thickness of clothing, and other characteristics) or the looseness of the seat belt.

Furthermore, since the belt tension is gradually increased, it is possible to more rapidly reach the optimum state of restraint by the seat belt during an emergency when there is a transition from the stage in which an emergency is predicted to a stage in which the emergency occurs.

An electric motor usually generates a large starting torque when moving from a state of complete rest. In contrast, in the first aspect of the present invention, the electric motor is not completely stopped, but is caused to repeatedly alternate between low-speed rotation and high-speed rotation. The electric motor therefore changes from a low-speed state to a high-speed state and from the high-speed state to the low-speed state. Rather than generating a large starting torque, the electric motor merely generates a drive torque that is smaller than the starting torque in the low-speed state. This makes it possible to suppress the initial increase in the belt tension caused by the retraction of the seat belt. As a result, the momentary change in restraining force that accompanies the belt vibration is made gradual. Accordingly, it is possible to minimize the seat belt impact shock that is felt by the occupant.

Since the electric motor is not completely stopped, a more even drive torque can be obtained when the electric motor changes from the low-speed state to the high-speed state. As a result, "deviation" in the momentary change in restraining force can be minimized. Accordingly, the change in the seat belt impact shock felt by the occupant can also be minimized.

In the arrangement according to the first aspect of the present invention, it is possible to more reliably call the attention of an occupant while maintaining the comfort of the occupant by imparting a more suitable belt vibration to the occupant. A conventional pretensioner may be employed without modifying the structure thereof to minimize the seat belt impact shock that is felt by the occupant.

Preferably, the control unit is arranged to control the electric motor such that a drive torque generated by the electric motor increases in direct proportion to the urgency of the predicted emergency condition.

In a preferred form, the control unit is arranged to control the electric motor such that a drive torque generated by the electric motor decreases over time after repetitive control of the electric motor is initiated.

According to a second aspect of the present invention, there is provided a vehicle seat belt device comprising: a seat belt for restraining an occupant who is seated in a seat of a vehicle; a pretensioner for retracting a loose portion of the seat belt during an emergency; an electric motor for driving the pretensioner; and a control unit for controlling the electric motor, wherein, when an emergency condition of the vehicle is predicted, the control unit selects a mode that corresponds to a nature of the predicted emergency condition from among a plurality of drive control modes for controlling the electric motor at the time of prediction, and controls the electric motor based on the selected mode, and the plurality of drive control modes comprise first drive control modes having control characteristics whereby the electric motor is controlled so as to continuously rotate only in a belt retraction direction and repeatedly alternate between low-speed rotation and high-speed rotation, and second drive control modes having characteristics in which at least one of characteristics of the electric motor that include a repetition time characteristic, a drive torque characteristic, and a rotational direction characteristic differs from the control characteristics of the first drive control modes.

The control unit can therefore select a mode that corresponds to the nature of the predicted emergency condition from among a plurality of drive control modes for controlling the electric motor, and control the electric motor based on the selected mode when an emergency condition of the vehicle is predicted.

When a first drive control mode is selected, it is possible to cause the electric motor to continuously rotate in the belt retraction direction and repeatedly alternate between low-speed rotation (including an extremely small rotational speed) and high-speed rotation when an emergency condition is predicted in the vehicle. The retraction speed of the seat belt therefore fluctuates. As a result, since there is fluctuation in the degree to which the belt tension is increased by the retracting action, the seat belt vibrates. This vibration can be used to alert and call the attention of the occupant to a predicted emergency condition. The belt tension also increases gradually (in stages, or steadily). As the belt tension gradually increases, the restraining force of the seat belt felt by the occupant himself also gradually increases. When an emergency condition is predicted, the restraining force gradually increases even when the apparent restraining force is too small, or the seat belt is loose. The occupant can therefore quickly take notice of the vibration of the seat belt. The occupant can thus be more reliably alerted.

Presetting the drive torque generated by the electric motor at the time of prediction to a small value makes it possible to have a weak vibration of the belt when the prediction is first made, and then to gradually increase the vibration.

The discomfort imparted to the occupant by the belt vibration alert can thereby be eliminated.

The occupant can thus be more reliably alerted, the discomfort of the alert can be eliminated, and the comfort of the occupant can be maintained by vibrating the seat belt in the prediction stage regardless of the state of the occupant (occupant's body position, the type or thickness of clothing, and other characteristics) or the looseness of the seat belt.

Furthermore, since the belt tension is gradually increased, it is possible to more rapidly reach the optimum state of restraint by the seat belt during an emergency when there is a transition from the stage in which an emergency is predicted to a stage in which the emergency occurs.

When a second drive control mode is selected, the electric motor can be operated according to characteristics in which at least one of characteristics of the electric motor that include a repetition time characteristic, a drive torque characteristic, and a rotational direction characteristic differs from control characteristics of the first drive control modes. The electric motor is operated according to different characteristics, and the pattern of the seat belt vibration, or the restraining force of the seat belt that is felt by the occupant himself, is therefore different.

Since the operating characteristics of the electric motor can be varied according to the nature of the predicted emergency condition, the occupant can be rapidly and reliably notified of the nature of the predicted emergency condition.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

Figure 1:
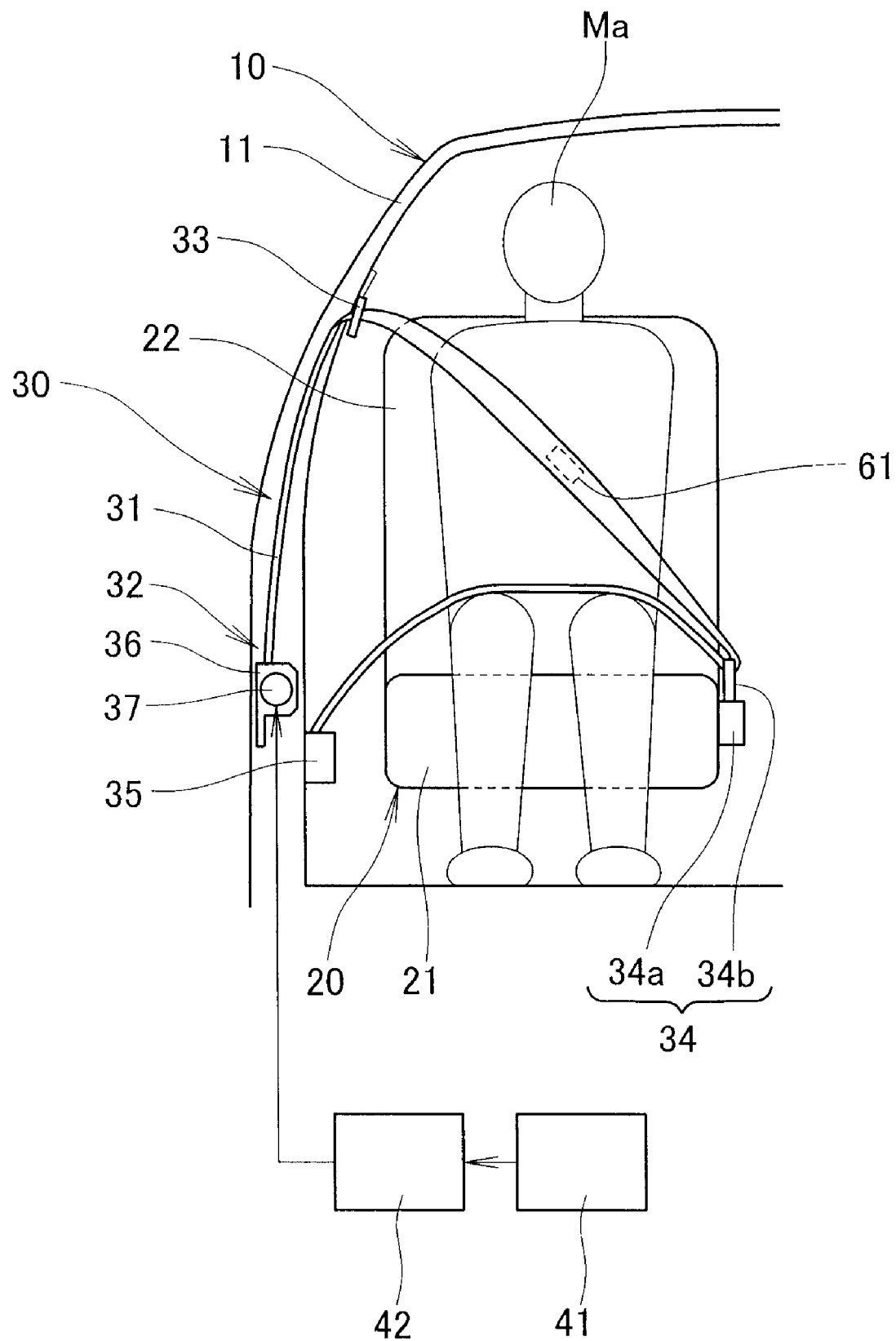
FIG. 1 is a schematic view showing part of a vehicle employing a seat belt device according to the present invention.

As shown in FIG. 1, the seat 20 and vehicle seat belt device 30 are mounted in the cabin of a vehicle 10.

The seat 20 is composed of a seat cushion 21 and a seat back 22 that is mounted to the seat cushion 21 so as to be capable of reclining (swinging forward and backward).

The vehicle seat belt device 30 uses a seat belt 31 to restrain an occupant Ma who is seated in the seat 20. The seat belt 31 that simultaneously restrains the waist region and one of the shoulders of the occupant Ma can be retracted by a retractor 32 (belt retraction device 32) that is fixed to the lower side portion of a vehicle body 11. The occupant Ma is a driver seated in the driver's seat, for example.

This type of vehicle seat belt device 30 has a three-point structure, for example, in which the seat belt 31 is supported by three anchors that include an upper anchor 33, a center anchor 34, and a lower anchor 35. The upper anchor 33 is provided in an upper portion of a side portion of the vehicle body 11. The center anchor 34 is provided to a lower portion on the opposite side of the seat 20 from the upper anchor 33. This center anchor 34 is composed of a retaining mechanism whereby a tongue 34b is removably fitted in one-touch fashion to a buckle 34a mounted towards the vehicle body. The lower anchor 35 is provided to the lower portion of the side on which the upper anchor 33 is mounted.

The retractor 32 is provided with a pretensioner 36 for rapidly retracting a loose portion (slackened portion) of the seat belt 31 during an emergency (a collision, for example) in the vehicle 10. The pretensioner 36 is a publicly known electrically operated pretensioner that retracts the loose portion of the seat belt 31 through the use of a drive torque generated by an electric motor 37 according to the operating conditions (including during an emergency in the vehicle 10) of the vehicle 10. In other words, the pretensioner 36 is configured so that the loose portion of the seat belt 31 is retracted by a spool (belt retraction reel) as the spool is rotated via a gear mechanism by a drive torque that is generated by the electric motor 37. The restraining force of the seat belt 31 can be increased by retracting the loose portion of the seat belt 31 through the use of the pretensioner 36. The electric motor 37 is a drive source controlled by a control unit 41, and is a direct-current motor, for example.

The vehicle seat belt device 30 is thus provided with a seat belt 31 for restraining an occupant Ma who is seated in the seat 20, a pretensioner 36 for retracting the loose portion of the seat belt 31 during an emergency, an electric motor 37 for driving the pretensioner 36, and a control unit 41 for controlling the electric motor 37.

Figure 2:
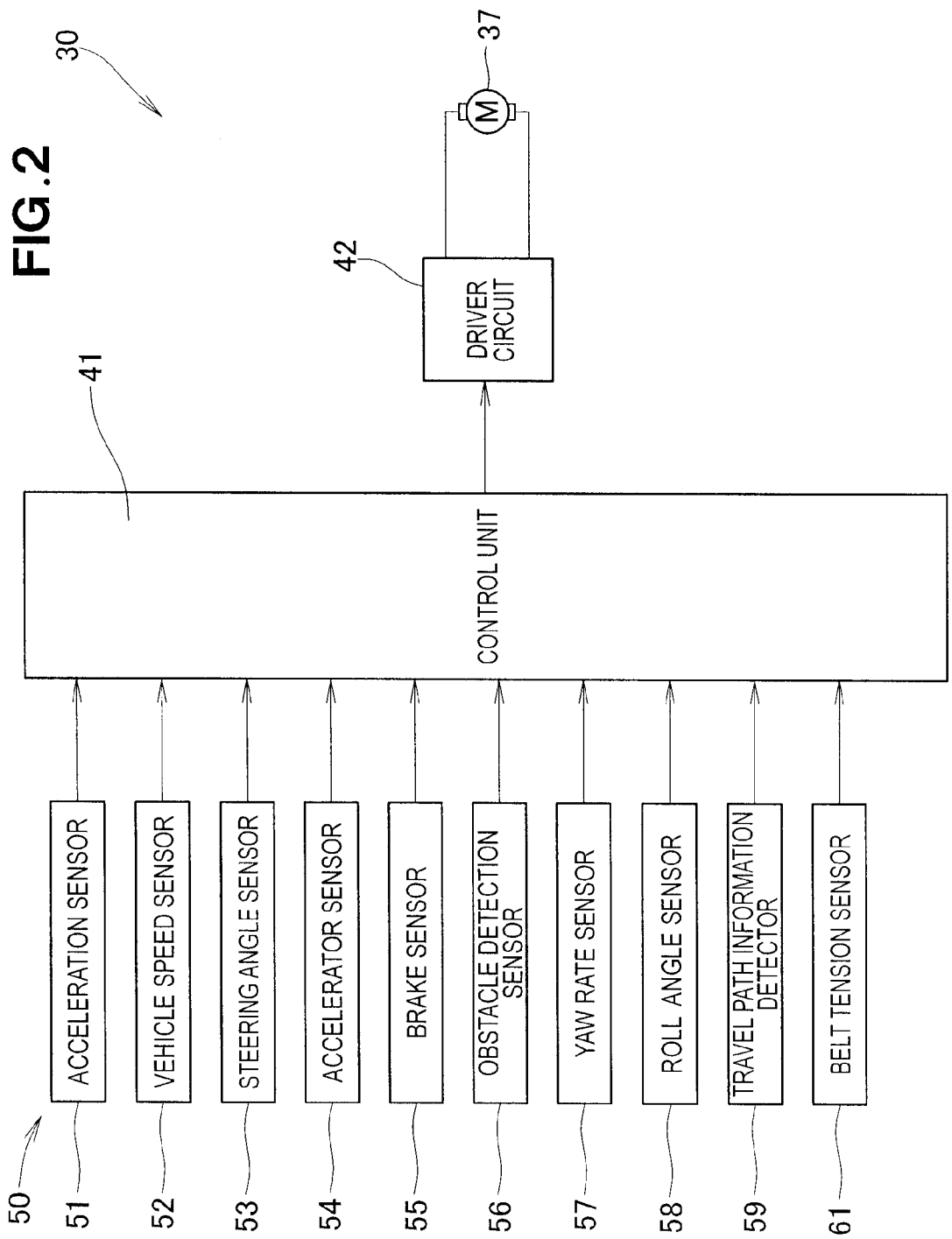
FIG. 2 is a circuit diagram of the vehicle seat belt device of FIG. 1.

As shown in FIG. 2, the vehicle seat belt device 30 has a circuit that is primarily composed of the control unit 41 for controlling the electric motor 37 via a driver circuit 42, and a detector group 50 for issuing various types of detection signals to the control unit 41. The driver circuit 42 outputs a drive current to the electric motor 37 in accordance with a control signal of the control unit 41.

The detector group 50 is composed of various types of sensors that include an acceleration sensor 51, a vehicle speed sensor 52, a steering angle sensor 53, an accelerator sensor 54, a brake sensor 55, an obstacle detection sensor 56, a yaw rate sensor 57, a roll angle sensor 58, a travel path information detector 59, and a belt tension sensor 61.

The acceleration sensor 51 is a unit for detecting an amount of acceleration added to the vehicle 10 (see FIG. 1). The vehicle speed sensor 52 is a unit for detecting the travel speed (vehicle speed) of the vehicle 10. The steering angle sensor 53 is a unit for detecting the steering angle (including the steering direction) of a steering wheel. The accelerator sensor 54 is a unit for detecting the accelerator pedal travel. The brake sensor 55 is a unit for detecting the brake pedal travel.

The obstacle detection sensor 56 is a unit for detecting objects (specifically, obstacles) that are present around the vehicle 10 (hereinafter referred to as the "driver's own vehicle 10" or the "driver's car 10" as appropriate) being operated by the driver Ma shown in FIG. 1. The obstacle detection sensor 56 is composed of an ultrasonic sensor, an infrared sensor, an ultraviolet sensor, a visible light sensor, a laser sensor, a radar sensor, or a CCD or other imaging system (camera system), for example. The obstacle detection sensor 56 is mounted at the front of the vehicle body 11 (see FIG. 1), for example. The obstacle detection sensor 56 mounted at the front detects obstacles that are in front of the driver's car 10. An obstacle in front of the vehicle may be a vehicle or other moving object that is traveling in front of the driver's car 10, a tree or other stationary object, or the like.

The yaw rate sensor 57 is a unit for detecting a yaw rate that occurs in the vehicle 10. The yaw rate is the angular velocity of yaw when the vehicle body undergoes yaw movement (yawing; rotation about a vertical axis that passes through the center of mass of the vehicle body).

The roll angle sensor 58 is a unit for detecting the angle of rolling that occurs in the vehicle 10. The roll angle is the angle of rotation when the vehicle body 11 undergoes a rolling motion (rolling; rotation about a longitudinal axis that passes through the center of mass of the vehicle body).

The travel path information detector 59 is a unit for detecting map information or travel path information, and is composed of a car navigation system, for example.

As shown in FIGS. 1 and 2, the belt tension sensor 61 is a unit for detecting the belt tension imparted to the seat belt 31, and is composed, for example, of a "strain sensor" embedded in the seat belt 31.

The control unit 41 receives various detection signals from the detector group 50, determines whether an emergency condition is present with respect to the vehicle 10, and controls the drive of the electric motor 37 so as to retract the loose portion of the seat belt 31 when there is an emergency with respect to the vehicle 10. The control unit 41 also receives the various detection signals of the detector group 50, and controls the drive of the electric motor 37 so as to cause the seat belt 31 to vibrate when an emergency condition is predicted with respect to the vehicle 10. The control signal issued by the control unit 41 is a pulse-width modulated signal (PWM signal), for example.

The phrase "during an emergency with respect to the vehicle 10" refers to the occurrence of the following types of emergency conditions, for example. Specifically, when the signal generated from detection by the acceleration sensor 51 exceeds a certain preset reference acceleration, the control unit 41 determines that the vehicle 10 has collided with an obstacle. This situation is an emergency with respect to the vehicle 10.

The phrase "when the control unit 41 predicts an emergency condition for the vehicle 10" refers to the occurrence of at least any one of the conditions (1) through (5) described below.

(1) When the vehicle speed detected by the vehicle speed sensor 52 is equal to or higher than a certain speed, the control unit 41 determines (the "second emergency condition prediction" described hereinafter) that the speed is too high.

(2) When the width of variation in the steering angle of the steering wheel is small, or the frequency with which the accelerator pedal or brake pedal is applied is small within a certain period of time, the control unit 41 determines (the "third emergency condition prediction" described hereinafter) that the driver Ma is asleep at the wheel. The steering angle is detected by the steering angle sensor 53. The frequency of accelerator pedal application is detected by the accelerator sensor 54. The frequency of brake pedal application is detected by the brake sensor 55.

(3) When the vehicle 10 is traveling at any speed, and the vehicle at that speed is coming too close to a frontal obstacle (the distance from the driver's car 10 to the obstacle is equal to or less than a certain value), the control unit 41 determines (the "third emergency condition prediction" described hereinafter) that a collision is likely. The vehicle speed is detected by the vehicle speed sensor 52. The distance from the driver's car 10 to the obstacle is detected by the obstacle detection sensor 56.

(4) When the values detected by the yaw rate sensor 57 and the roll angle sensor 58 are too large, the control unit 41 determines (the "second emergency condition prediction" described hereinafter) that the vehicle 10 is likely to roll due to extreme driving that involves sudden changes in the bearing of the vehicle 10.

(5) When the map information or travel path information detected by the travel path information detector 59 indicates that the vehicle 10 is approaching a sharp curve, adverse road conditions, or the like, the control unit 41 determines (the "first emergency condition prediction" described hereinafter) a need for cautious driving.

Figure 3:
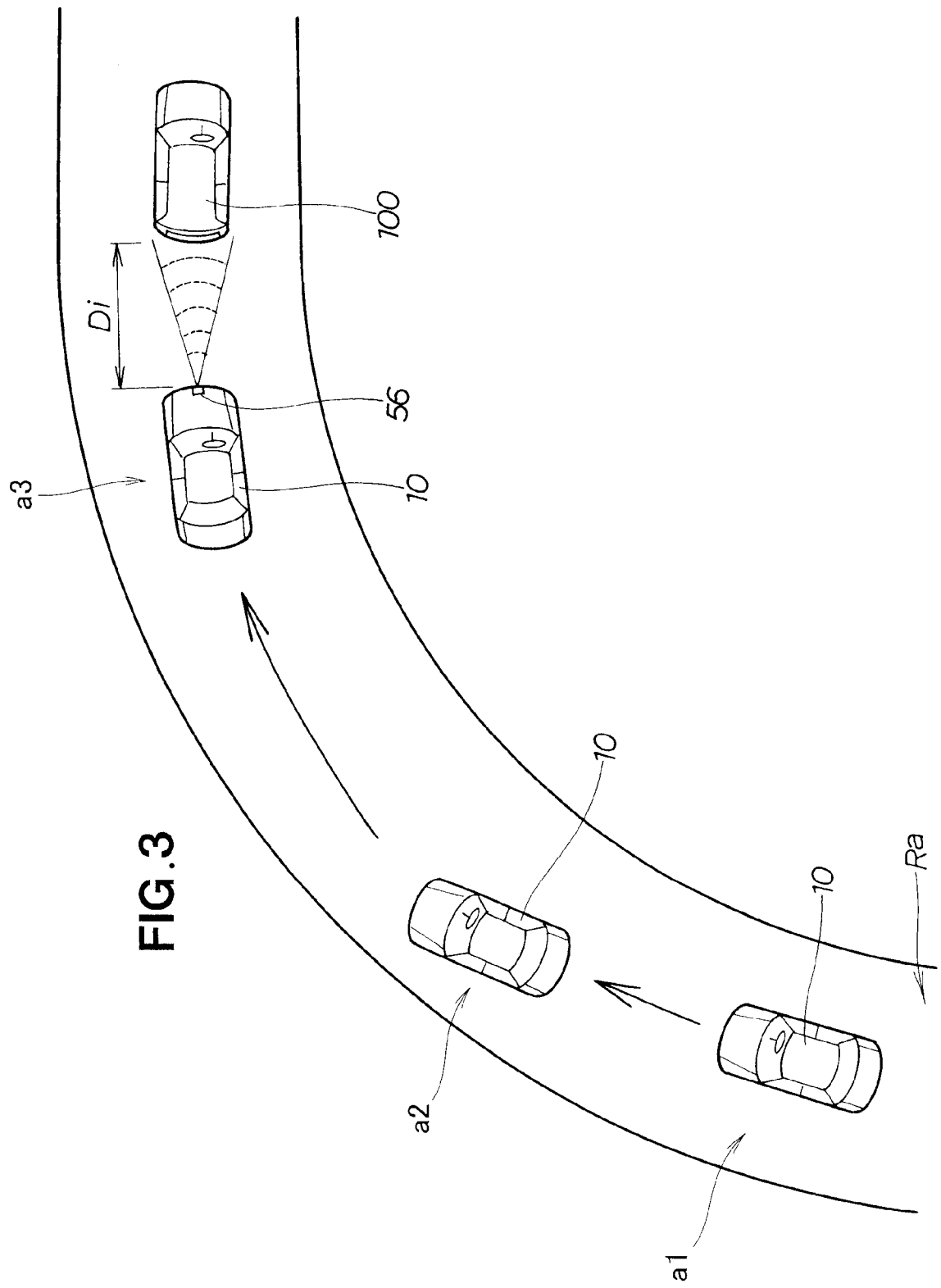
FIG. 3 is a schematic view showing an example travel of the vehicle employing the vehicle seat belt device of FIG. 1.

The three behaviors, i.e., the abovementioned "first emergency condition," "second emergency condition," and "third emergency condition," among the behaviors of the vehicle 10 during travel will next be described in further detail. FIG. 3 is a plan view showing the behavior of the vehicle 10 during travel on the travel path Ra.

First, the first travel state a1 shown in FIG. 3 indicates a state in which the vehicle 10 has entered a curve (corner) in the travel path Ra. At this time, the control unit 41 (see FIG. 2) determines a need for cautious driving. The nature of the predicted emergency condition at this time will be referred to as the "first emergency condition."

The second travel state a2 shown in FIG. 3 indicates a state in which the vehicle 10 has reached a maximum change in bearing, or a state of travel at an excessive speed. At this time, the control unit 41 determines that rolling is likely, or that the speed is excessive. The nature of the predicted emergency condition at this time will be referred to as the "second emergency condition."

The third travel state a3 shown in FIG. 3 indicates a state in which the car-to-car distance Di to another vehicle 100 traveling in front of the driver's car 10 is too small, and the cars are traveling too close to each other. At this time, the control unit 41 determines that a collision is likely. The nature of the predicted emergency condition at this time will be referred to as the "third emergency condition."

The control routines performed when the control unit 41 shown in FIG. 2 is a microcomputer will next be described. In this control sequence, control is initiated when the ignition switch (not shown) is turned on, and control is ended when the ignition switch is turned off, for example. The description below is based on FIG. 4 and makes reference to FIGS. 1 through 3.

Step (hereinafter abbreviated as "ST") ST01: The detection signals of the various detectors 51 through 61 are read, and the process then proceeds to ST02.

ST02: The conditions around the vehicle 10 (road conditions, positioning of surrounding obstacles, and other conditions) or the manner in which the vehicle 10 is being operated is determined, after which the process proceeds to ST03.

ST03: The emergency condition of the vehicle 10 is determined based on the operating conditions or surrounding conditions that were determined in ST02. Specifically, when the travel conditions are determined to be normal (there is no emergency condition or predicted emergency), the process proceeds to ST04. The process proceeds to ST05 when the vehicle 10 has collided with an obstacle or another emergency condition is determined with respect to the vehicle 10. When a determination is made that an emergency condition is predicted with respect to the vehicle 10, the process proceeds to ST06.

ST04: Since conditions are normal, there is no need to retract the loose portion of the seat belt 31. After the electric motor 37 has been stopped or maintained in a stopped state, the process returns to ST01.

ST05: Since an emergency condition has occurred with respect to the vehicle 10, drive control is performed to cause the electric motor 37 to rotate forward, after which control according to this control sequence is ended. As a result, the electric motor 37 quickly retracts the loose portion of the seat belt 31 to cause restraint. An occupant Ma who is seated in the seat 20 can be protected.

ST06: Since an emergency condition is predicted, the nature of the predicted emergency condition is ascertained based on the operating conditions or surrounding conditions that were determined in ST02. When a determination is made that the predicted emergency condition is the "first emergency condition" (for example, the state of a1 shown in FIG. 3), the process proceeds to ST07. When a determination is made that the predicted emergency condition is the "second emergency condition" (for example, the state of a2 shown in FIG. 3), the process proceeds to ST08. When a determination is made that the predicted emergency condition is the "third emergency condition" (for example, the state of a3 shown in FIG. 3), the process proceeds to ST09.

ST07: A first motor control map that corresponds to the first emergency condition is selected from a plurality of motor control maps for controlling the electric motor 37 at the time of prediction, and the process then proceeds to ST10. The first motor control map will be described hereinafter (see FIG. 6A).

ST08: A second motor control map that corresponds to the second emergency condition is selected from the plurality of motor control maps for controlling the electric motor 37 at the time of prediction, and the process then proceeds to ST10. The second motor control map will be described hereinafter (see FIG. 8A).

ST09: A third motor control map that corresponds to the third emergency condition is selected from the plurality of motor control maps for controlling the electric motor 37 at the time of prediction, and the process then proceeds to ST10. The third motor control map will be described hereinafter (see FIG. 9A).

ST10: The urgency of the predicted emergency condition is determined. When the urgency of the emergency is determined to be low, the process proceeds to ST11. When the urgency of the emergency is determined to be medium, the process proceeds to ST12. When the urgency of the emergency is determined to be high, the process proceeds to ST13.

ST11: Since the urgency of the emergency is "low," the drive current (target current) that is fed to the electric motor 37 is set to a low value, and the process then proceeds to ST14.

ST12: Since the urgency of the emergency is "medium," the drive current (target current) that is fed to the electric motor 37 is set to a medium value, and the process then proceeds to ST14.

ST13: Since the urgency of the emergency is "high," the drive current (target current) that is fed to the electric motor 37 is set to a large value, and the process then proceeds to ST14.

ST14: The actual belt tension Btr imparted to the seat belt 31 is measured by the belt tension sensor 61, and the process then proceeds to ST15.

ST15: A determination is made as to whether the actual belt tension Btr is below a certain preset reference maximum tension Bto, and the process proceeds to ST16 when the result of the determination is YES. When the result of the determination is NO, a determination is made that the reference maximum tension Bto has been reached, and the process proceeds to ST17.

ST16: Driving of the electric motor 37 is controlled based on the motor control map selected in ST07 through ST09 and on the target current set in ST11 through ST13, and the process then returns to ST01. As a result, the seat belt 31 can be caused to vibrate.

ST17: Since the actual belt tension Btr has reached the reference maximum tension Bto, the process returns to ST01 after the electric motor 37 is stopped or a stopped state is maintained therein.

As is apparent from the description given above, the combination of ST02 and ST03 constitutes an emergency condition determination unit for determining an emergency condition for the vehicle 10, and a prediction unit for predicting an emergency condition.

The combination of ST02 and ST06 through ST09 constitutes a drive control mode selection unit for selecting a single mode that corresponds to the nature of the predicted emergency condition from among a plurality of drive control modes that is used to control the electric motor 37 at the time of prediction.

The combination of ST02 and ST10 through ST13 constitutes a motor drive torque adjustment unit for increasing the drive torque generated by the electric motor 37 as the urgency of the predicted emergency increases.

ST16 constitutes a motor drive unit for controlling the drive of the electric motor 37 based on the actions of the prediction unit, the drive control mode selection unit, and the motor drive torque adjustment unit.

The first, second, and third mode control maps described above in ST07 through ST09 will next be described with reference to FIG. 1.

The first motor control map will first be described based on FIGS. 5 through 7.

Figure 5:
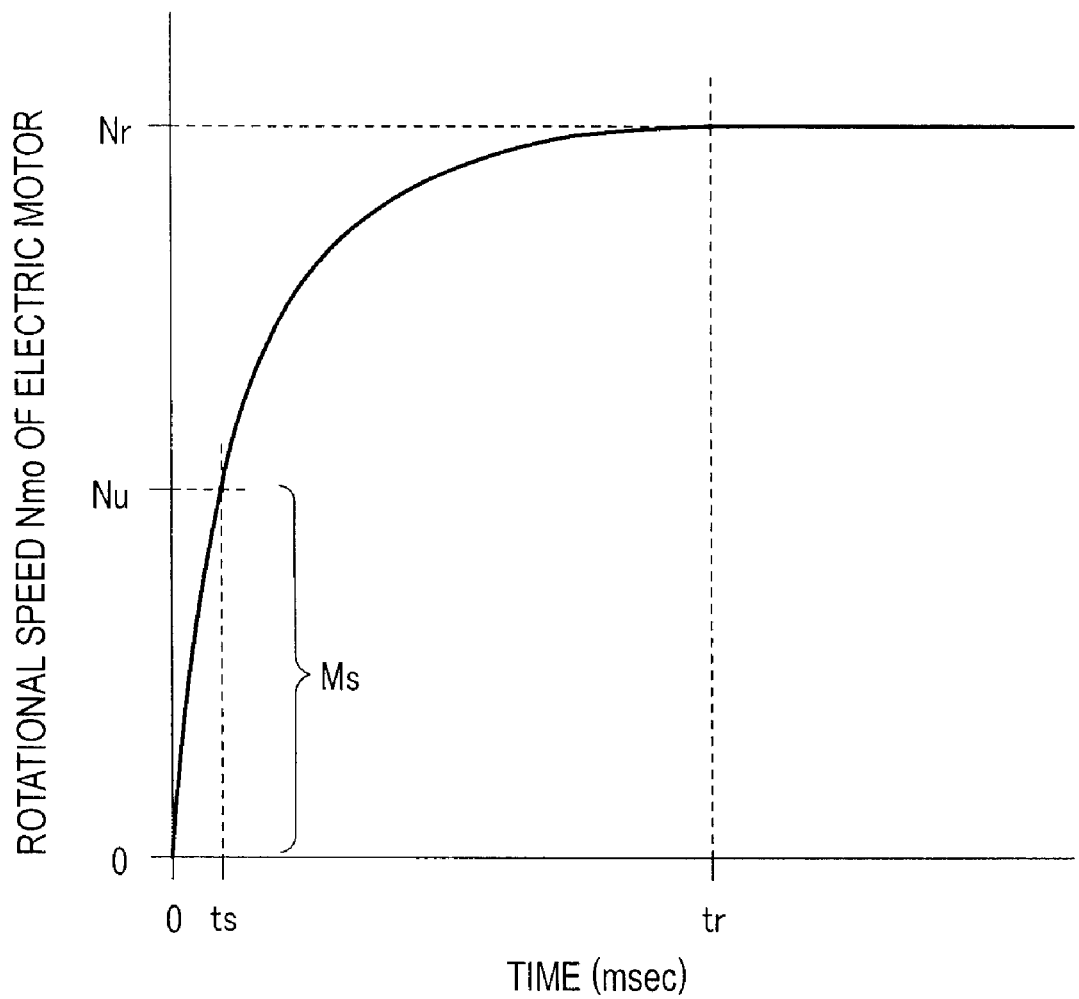
FIG. 5 is a view showing the characteristics of an electric motor shown in FIG. 1.

FIG. 5 shows a characteristic curve of the rotational speed of the electric motor 37, wherein the horizontal axis indicates time (units: msec), and the vertical axis indicates the rotational speed (rotation speed) Nmo. As indicated by the characteristic curve of the rotational speed in FIG. 5, the rotational speed Nmo rapidly increases (accelerates) from the time that the electric motor 37 is started, and reaches and maintains a constant rotational speed Nr when time tr has elapsed after startup. Time tr is several hundred milliseconds (about 100 to 300 msec, for example).

In the characteristic curve of the rotational speed shown in FIG. 5, the region of the rotational speed Nmo from the startup time until a certain startup rising time ts will be referred to herein as the startup rising acceleration region Ms. The startup rising acceleration region Ms is the region in which the rotational speed Nmo rapidly increases. The value of the rotational speed Nmo when the startup rising time ts has elapsed is Nu. The maximum value Nu in the startup rising acceleration region Ms is referred to as the upper limit rotational speed Nu (upper-limit value Nu).

In a common motor usage method, a load is driven in a state (steady operation state) in which the rotational speed of the electric motor 37 has reached a constant speed Nr.

However, the present invention takes advantage of the rotational speed characteristics prior to reaching the constant speed Nr when an emergency condition is predicted with respect to the vehicle 10, and control is performed so that the electric motor 37 is driven in the belt retraction direction. In other words, the rotational speed characteristics of the startup rising characteristic portion Ms are utilized when the electric motor 37 is predictively driven in the retraction direction. The control that utilizes the rotational speed characteristics of the startup rising characteristic portion Ms will be described hereinafter.

Figure 6A:
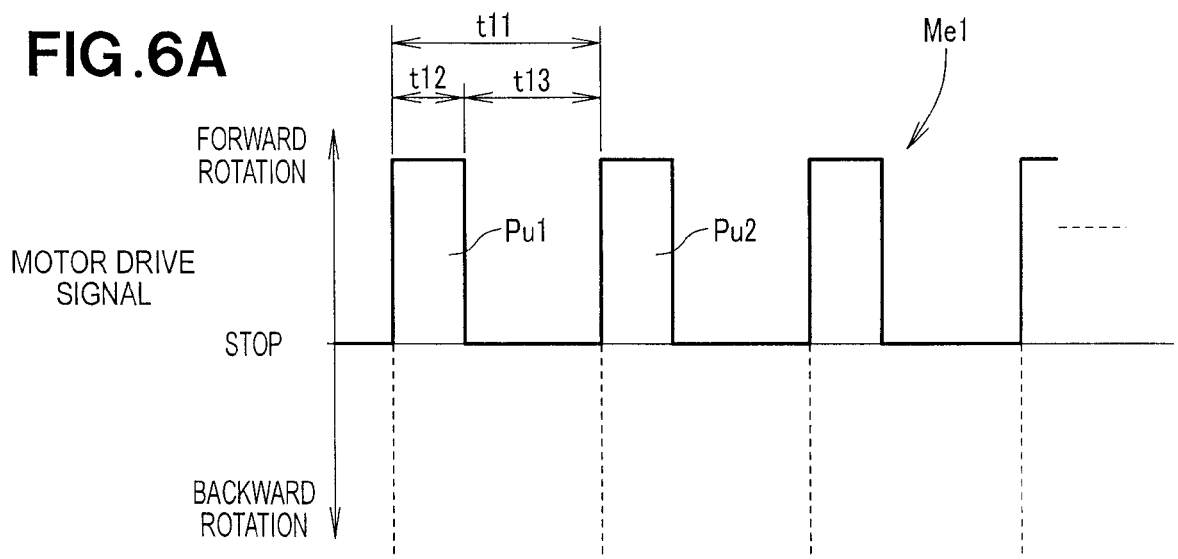
FIG. 6 is a view showing a first motor control map of the control unit shown in FIG. 1, and the electric motor and belt tension characteristics that correspond to the map.
Figure 6B:
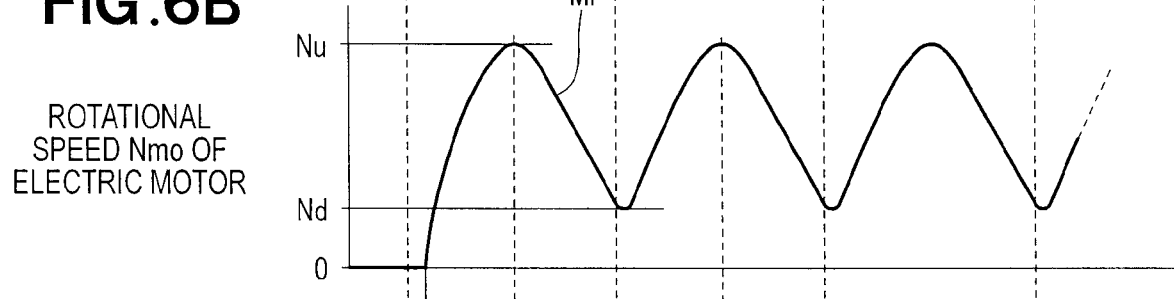
Figure 6C:
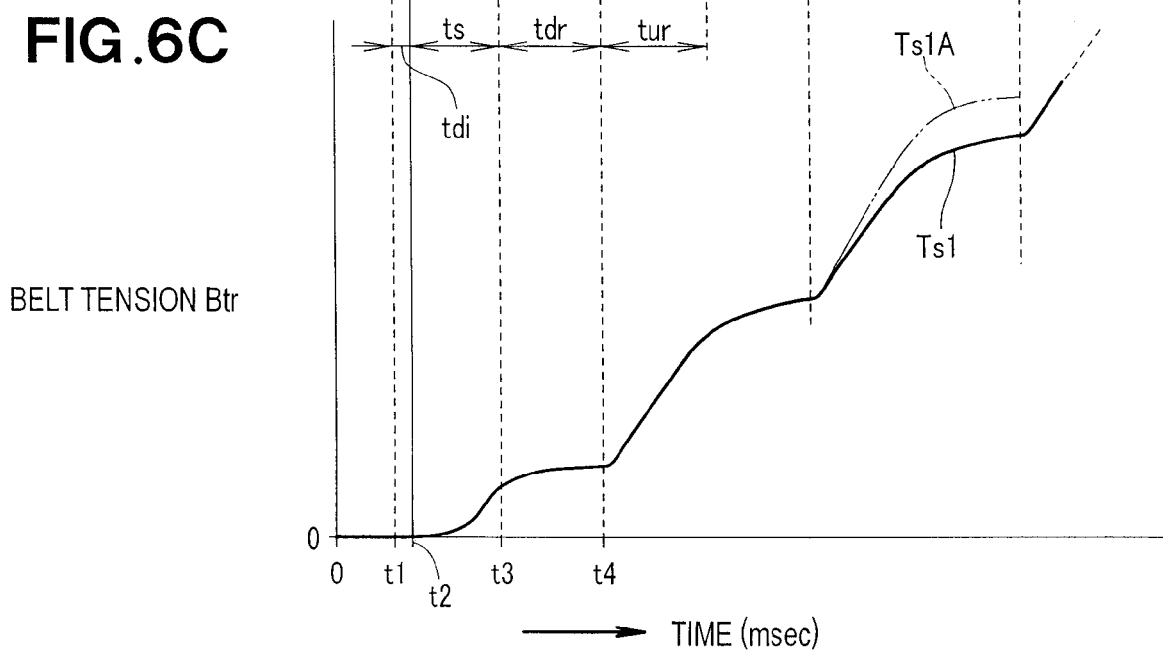

FIG. 6A shows the characteristics of the motor drive signal according to an embodiment, wherein the horizontal axis indicates time (units: msec), and the vertical axis indicates the motor drive signal. FIG. 6B shows a rotational speed characteristic curve Mi that indicates the change in the rotational speed Nmo according to the motor drive signal characteristics shown in FIG. 6A, wherein the horizontal axis indicates time (units: msec), and the vertical axis indicates the rotational speed Nmo of the electric motor. FIG. 6C shows a belt tension characteristic curve Ts1 that indicates the change in belt tension Btr according to the rotational speed characteristic curve Mi shown in FIG. 6B, wherein the horizontal axis indicates time (units: msec), and the vertical axis indicates the belt tension Btr.

As shown in FIG. 6A, the control unit 41 begins to generate a motor drive signal (control signal) at the signal generation start time t1. The motor drive signal is an intermittent forward rotation pulse (drive current pulse) having a constant pitch. The forward rotation pulses are square pulses for causing the electric motor 37 to rotate (forward rotation) only in the direction in which the seat belt 31 is retracted by the pretensioner 36. The pitch (period) between forward rotation pulses is t11, the pulse width is t12, and inter-pulse time is t13.

More specifically, a drive current flows to the electric motor 37 when the first forward rotation pulse Pu1 is generated at the signal generation start time t1. As shown in FIG. 6B, the electric motor 37 remains stopped at the signal generation start time t1. The electric motor 37 begins to rotate in the forward rotation direction at the motor startup initiation time t2 that occurs after a slight elay time tdi. The delay time tdi from t1 to t2 corresponds to a response delay time (time until a response begins) according to the effects of the inertia of the electric motor 37 itself and other factors.

A certain startup rising time ts is required for the electric motor 37 to accelerate from a state of complete rest to the upper limit rotational speed Nu (upper-limit value Nu). The time at which the startup rising time ts has elapsed after the motor startup initiation time t2 is referred to as the upper limit arrival time t3. The pulse width t12 is set to a time that is shorter than the startup rising time ts.

The upper-limit value Nu herein is the same as the upper-limit value Nu of the "startup rising acceleration region Ms" shown in FIG. 5. As described above, the characteristics of the rotational speed when the rotational speed Nmo of the electric motor 37 increases from 0 (zero) to the upper-limit value Nu are the same as the characteristics of the startup rising acceleration region Ms shown in FIG. 5. The present embodiment thus utilizes only the rotational speed characteristics of the startup rising acceleration region Ms before the constant speed Nr (see FIG. 5) is reached when the electric motor 37 is controlled so as to drive in the belt retraction direction.

The upper-limit value Nu is sufficiently small in relation to the constant speed Nr. Therefore, the rotational speed characteristics when the rotational speed Nmo increases from 0 to the upper-limit value Nu are not significantly dependent on the level of the voltage applied to the electric motor 37. For example, even when the voltage is increased, the rotational speed characteristics of the increase from 0 to the upper-limit value Nu as such (i.e., the response characteristics as such of the electric motor 37) do not significantly change.

Then, after generation of the initial forward rotation pulse Pu1 is ended, the power supply to the electric motor 37 is suspended for the inter-pulse time t13 until the next forward rotation pulse Pu2 is generated. Inertia acts on the electric motor 37 even when the power supply is suspended. The rotational speed Nmo of the electric motor 37 therefore reaches the upper-limit value Nu after a slight delay time elapses after suspension of the first forward rotation pulse Pu1, and the rotational speed Nmo then gradually decreases to a lower-limit value Nd.

The inter-pulse time t13 is set so that the next forward rotation pulse Pu2 is generated before the electric motor 37 comes to a complete stop. The rotational speed Nmo is never below the lower-limit value Nd (lower-limit rotational speed Nd) at the start time t4 of the next forward rotation pulse Pu2.

In other words, the inter-pulse time t13 is set with consideration for the time tdr required for the rotational speed Nmo to decrease from the upper-limit value Nu to the lower-limit value Nd. The rotational speed Nmo therefore never falls below the lower-limit value Nd. The lower-limit value Nd herein is set to a certain extremely low speed that is just above stoppage of the electric motor 37, for example.

The response delay time from the start time t4 of the next forward rotation pulse Pu2 until the rotational speed Nmo begins to increase again is extremely short, being on the order of a few milliseconds, and can therefore be ignored.

In the same manner, the rotational speed Nmo of the electric motor 37 decreases to the lower-limit value Nd after increasing to the upper-limit value Nu according to the generation and suspension of the next forward rotation pulse Pu2. The rotational speed Nmo thereafter changes according to the generation and suspension of a plurality of forward rotation pulses.

The operations described above are summarized as follows. The electric motor 37 continues to rotate forward (rotates intermittently in the belt retraction direction only) and repeatedly alternates between low-speed rotation (rotation at an extremely low speed) at the lower-limit value Nd and high-speed rotation at the upper-limit value Nu. The belt tension Btr of the seat belt 31 increases each time the electric motor 37 rotates at high speed in the belt retraction direction, as shown in FIG. 6C. In other words, belt tension Btr changes as shown in FIG. 6C according to the change in the rotational speed Nmo shown in FIG. 6B.

The change in the belt tension Btr will be described hereinafter.

First, the electric motor 37 begins to rotate at time t2, and the belt tension Btr therefore begins to increase. The belt tension Btr then sharply increases until time t3 at which the rotational speed Nmo reaches the upper-limit value Nu. The belt tension Btr then gradually increases until the rotational speed Nmo returns to the lower-limit value Nd. Then, the retraction speed of the seat belt 31 becomes extremely low at the time the rotational speed Nmo returns to the lower-limit value Nd. The belt tension Btr is therefore maintained at the current value or slightly increased value. Then, since the rotational speed Nmo again increases, the belt tension Btr again begins to increase.

In other words, the belt tension Btr increases each time a forward rotation pulse is generated in FIG. 6A, and is slightly increased or maintained at the then-current value when there is no forward rotation pulse. The belt tension Btr thus alternates between a rapid increase when the seat belt 31 is retracted at high speed, and an extremely small increase when the seat belt 31 is retracted at an extremely low speed. The seat belt 31 vibrates as a result. This vibration can be used to alert an occupant Ma and call his attention to the fact that an emergency condition has been predicted.

The time tur (increasing time tur) in which the rotational speed Nmo increases from the lower-limit value Nd to the upper-limit value Nu, or the time tdr (decreasing time tdr) in which the rotational speed Nmo decreases from the upper-limit value Nu to the lower-limit value Nd is preferably set so that an occupant Ma can easily feel the vibration of the seat belt 31, and so as to minimize the sense of impact with the seat belt 31 that the occupant Ma feels.

When the increasing time tur or the decreasing time tdr is too long, it is difficult for the occupant Ma to feel the vibration of the seat belt 31. For example, the increasing time tur is preferably set to a value no higher than 50 msec, and is more preferably set to a value of 20 to 40 msec. The decreasing time tdr is determined according to the response delay characteristics with respect to a forward rotation pulse, the characteristics of the electric motor 37, or another factor required for the rotational speed Nmo to decrease from the upper-limit value Nu to 0 (zero). For example, the decreasing time tdr is preferably set to a value that does not exceed 25 msec, and is more preferably set to a value of 1 to 5 msec.

As is apparent from the above description, the motor drive signal characteristics shown in FIG. 6A have control characteristics for causing the electric motor 37 to alternate between low-speed rotation and high-speed rotation. In the present invention, the motor drive signal characteristics shown in FIG. 6A are utilized as the "first motor control map Me1" executed by the control unit 41. This first motor control map Me1 can be described as a basic drive control mode, i.e., a "first drive control mode Me1," that has control characteristics for causing the electric motor 37 to continuously rotate in only the belt retraction direction and repeatedly alternate between low-speed rotation at the lower-limit value Nd and high-speed rotation at the upper-limit value Nu.

A method for controlling the current or voltage while maintaining the power supply to the electric motor 37 can be considered in general terms as a control method for reducing the rotational speed Nmo to the lower-limit value Nd. However, since the electric motor 37 has an inherent inertia, holding power, or the like, the structure of the control unit 41 or driver circuit 42 is complicated by the need to precisely control the electric motor 37 so as to reach the lower-limit value Nd in an extremely short time, and this method is inadvisable because of increased cost.

However, in the present invention, the power supply to the electric motor 37 is stopped by setting the inter-pulse time t13 in the manner described above. The control structure of the control unit 41 or driver circuit 42 is therefore simplified, and cost can be reduced.

Figure 7A:
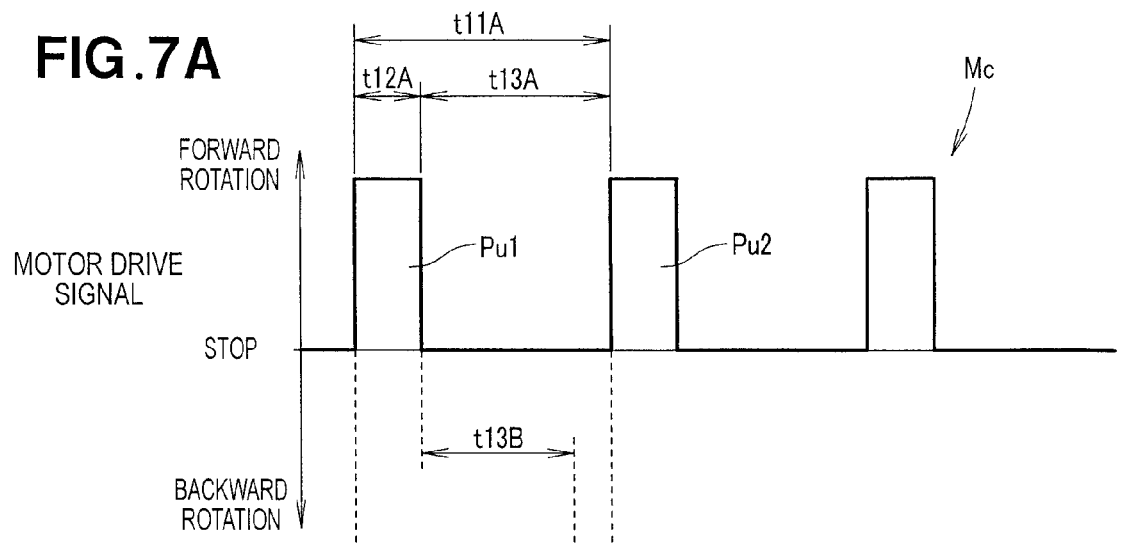
FIG. 7 is a view showing a first motor control map of a comparative example, and the electric motor and belt tension characteristics that correspond to the map.
Figure 7B:
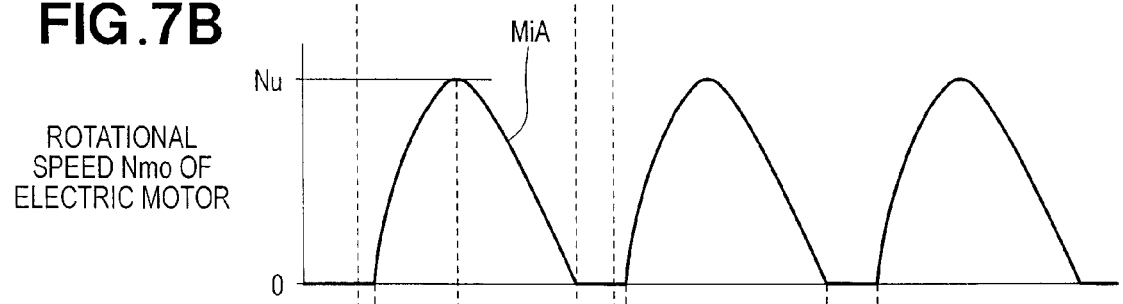
Figure 7C:
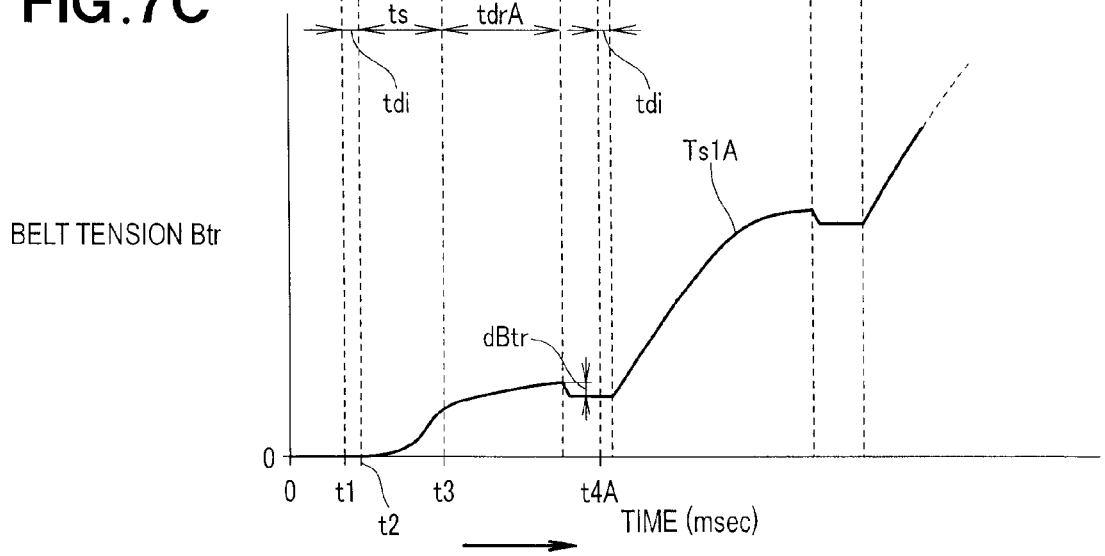

A first motor control map Mc according to a comparative example with respect to the first motor control map Me1 shown in FIG. 6A will next be described based on FIGS. 7A through 7C. FIGS. 7A through 7C are views showing the first motor control map of the comparative example, and the electric motor and belt tension characteristics that correspond to the map. The views shown in FIGS. 7A through 7C also correspond to those of FIGS. 6A through 6C.

FIG. 7A shows the motor drive signal characteristics of the comparative example, wherein the horizontal axis indicates time (units: msec), and the vertical axis indicates the motor drive signal. FIG. 7B shows a rotational speed characteristic curve MiA that indicates the change in the rotational speed Nmo according to the motor drive signal characteristics shown in FIG. 7A. In FIG. 7B, the horizontal axis indicates time (units: msec), and the vertical axis indicates the rotational speed Nmo of the electric motor. FIG. 7C shows a belt tension characteristic curve Ts1A that indicates the change in the belt tension Btr according to the rotational speed characteristic curve MiA shown in FIG. 7B. In FIG. 7C, the horizontal axis indicates time (units: msec), and the vertical axis indicates the belt tension Btr.

The forward rotation pulses of the comparative example shown in FIG. 7A have substantially the same waveform as the forward rotation pulses shown in FIG. 6A, the pitch (period) between pulses is t11A, the pulse width is t12A, and the inter-pulse time is t13A. In relation to the forward rotation pulses shown in FIG. 6A, the pitch t11A is larger than the pitch t11, the pulse width t12A is the same as the pulse width t12, and the inter-pulse time t13A is longer than the inter-pulse time t13. In other words, t11A>t11, t12A=t12, and t13A>t13.

As shown in FIGS. 7A and 7B, the inter-pulse time t13A is set so that the next forward rotation pulse Pu2 is generated after the electric motor 37 is completely stopped. In other words, the inter-pulse time t13A is longer than the time tdrA required for the rotational speed Nmo to decrease from the upper-limit value Nu to 0 (zero). In other words, the inter-pulse time t13A is longer than the time t13B taken for the electric motor 37 to come to a complete stop after generation of the first forward rotation pulse Pu1 is stopped. The rotational speed Nmo of the electric motor 37 therefore decreases to 0 (zero) prior to time t4A at which generation of the next forward rotation pulse Pu2 is initiated. As a result, the electric motor 37 comes to a complete stop.

As described above, the pretensioner 36 is configured so that the loose portion of the seat belt 31 is retracted by a spool as the spool is rotated by the electric motor 37 via a gear mechanism. Backlash occurs in the gears, and the seat belt 31 therefore loosens by an amount commensurate with the gap of the backlash or the like when the electric motor 37 is completely stopped. As a result, the belt tension Btr of the seat belt 31 decreases by a slight tension reduction amount dbtr as shown in FIG. 7C. The seat belt 31 is then retracted again as the stopped electric motor 37 begins to rotate again. Therefore, the belt tension Btr again increases. The belt tension Btr (i.e., the holding power of the belt) when the electric motor 37 is completely stopped can fluctuate according to the state of meshing between the gears in the pretensioner 36.

In the comparative example, the electric motor 37 starts to move from a state of complete stop each time a single forward rotation pulse is generated. Therefore, each time a forward rotation pulse is generated, a delay time tdi occurs that lasts from the time of generation until the electric motor 37 begins to move. The value of this delay time tdi is not necessarily constant. Accordingly, the rhythm of the belt vibration felt by the occupant Ma is unavoidably irregular. However, the vibration rhythm felt by the occupant Ma should preferably be regular and smooth.

Such measures as modifying the gear mechanism of the pretensioner 36 (changing the structure or significantly increasing the precision with which the gears mesh together) may be taken to make the delay time tdi constant. However, a measure that addresses the mechanical structure in this manner is inadvisable, because the degree of freedom in the design of the pretensioner 36 is reduced, and the cost of the pretensioner 36 is increased.

By contrast, the present invention is configured so that the lower-limit value Nd occurs at time t4, as shown in FIGS. 6A through 6C. As a result, time t4 becomes a point at which the change in the belt tension Btr diverges. In other words, the belt tension Btr changes at time t4 from a state in which the belt tension Btr is substantially maintained or slightly increased to a state in which the belt tension Btr begins to rapidly increase. The belt is caused to vibrate in this manner. Accordingly, a vibration rhythm that is regular and smooth for the occupant Ma can be obtained without modifying the structure of a conventional pretensioner 36. The degree of freedom in the design of the pretensioner 36 can also be maintained, and the cost of the pretensioner 36 can be prevented from increasing.

The electric motor 37 usually generates a large starting torque when starting from a state of complete rest. In the comparative example, the electric motor 37 generates a large starting torque each time a single forward rotation pulse is generated. The belt tension Btr therefore increases by a large amount each time a forward rotation pulse is generated. In other words, there is a large momentary change in the belt tension Btr.

The belt tension characteristic curve Ts1A of the comparative example shown in FIG. 7C will be described herein in comparison to the belt tension characteristic curve Ts1 of the present invention that is shown in FIG. 6C.

In FIG. 6C, the curve Ts1A indicated by the imaginary line indicates the transcription of the belt tension characteristic curve of the comparative example shown in FIG. 7C. As described above, according to the belt tension characteristic curve Ts1A of the comparative example, there is a large momentary change in the belt tension Btr (a characteristic having a large rising slope).

In contrast, the electric motor 37 in the first motor control map Me1 shown in FIG. 6A is not completely stopped, and is driven from the extremely low speed state of the lower-limit value Nd to the high-speed state of the upper-limit value Nu. When a single forward rotation pulse is generated, the drive torque generated by the electric motor 37 is smaller than the starting torque. The belt tension Btr therefore increases by a large amount each time a forward rotation pulse is generated. In other words, the momentary amount of change in the belt tension Btr is small in the belt tension characteristic curve Ts1 of the present invention, as indicated by the solid line in the drawing. As a result, the momentary change in restraining force that accompanies belt vibration is moderate. The shock of impact with the seat belt that the occupant feels can therefore be reduced.

A second mode control map will next be described based on FIGS. 8A and 8B.

Figure 8A:
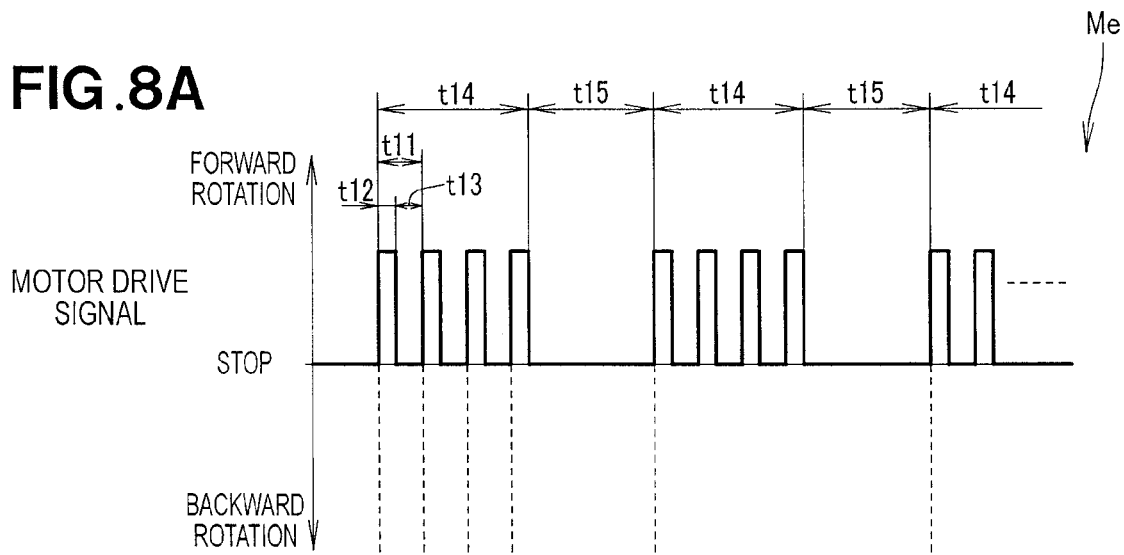
FIG. 8 is a view showing a second motor control map of the control unit shown in FIG. 1, and the belt tension characteristic that corresponds to the control map.

FIG. 8A shows the motor drive signal characteristics of an embodiment, wherein the horizontal axis indicates time (units: msec), and the vertical axis indicates the motor drive signal. FIG. 8B shows a belt tension characteristic curve Ts2 that indicates the change in the belt tension Btr according to the motor drive signal characteristics shown in FIG. 8A. In FIG. 8B, the horizontal axis indicates time (units: msec), and the vertical axis indicates the belt tension Btr.

The motor drive signal shown in FIG. 8A has control characteristics whereby forward rotation pulses (drive current pulses) are issued at a constant pitch to the electric motor 37 beginning at the signal generation start time t1. Each forward rotation pulse has essentially the same waveform as the forward rotation pulses shown in FIG. 6A. The pitch (period) between pulses is t11, the pulse width is t12, and inter-pulse time is t13.

However, the motor drive signal shown in FIG. 8A has so-called intermittent control characteristics whereby there is a repeated alternation between drive time zones t14 and pause time zones t15. The drive time zones t14 are zones of time in which a plurality of forward rotation pulses is generated at pitch t11. The pause time zones t15 are zones of time in which the generation of forward rotation pulses is completely stopped. The drive time zones t14 may have any size. The pause time zones t15 are longer than the inter-pulse time t13A in the comparative example shown in FIG. 7A.

Figure 8B:
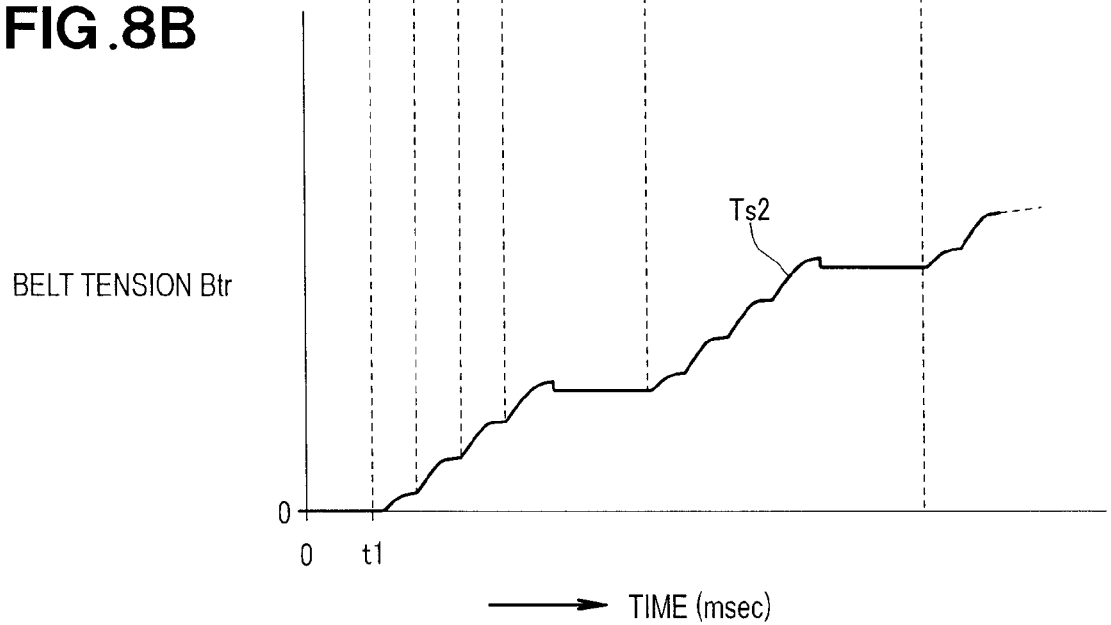

Accordingly, the belt tension Btr of the seat belt 31 increases in stages during the drive time zones t14 and maintains its value during the pause time zones t15, as shown in FIG. 8B. As a result, the seat belt 31 vibrates according to a different vibration characteristic than the one shown in FIG. 6C, i.e., according to a vibration characteristic that has pause time zones t15. This vibration can be used to alert and call the attention of the occupant Ma to a predicted emergency condition.

In the present invention, the motor drive signal characteristics shown in FIG. 8A are utilized as the "second motor control map Me2" executed by the control unit 41. The second motor control map Me2 has control characteristics in which the intermittent time characteristic of the electric motor 37 differs with respect to the control characteristics of the first motor control map Me1 shown in FIG. 6A. The second motor control map Me2 can therefore be described as another drive control mode, i.e., a "second drive control mode Me2" that differs from the "first drive control mode Me1" shown in FIG. 6A.

A third motor control map will next be described based on FIGS. 9A and 9B.

Figure 9A:
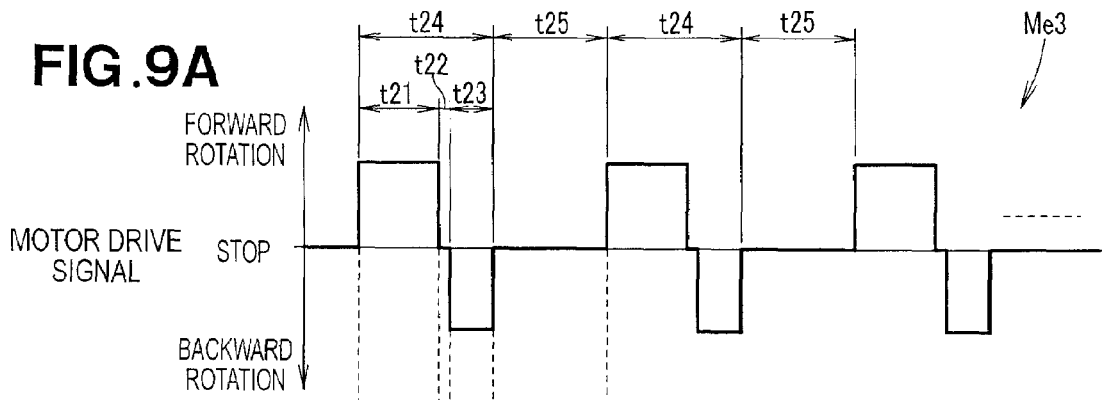
FIG. 9 is a view showing the first and third motor control maps of the control unit shown in FIG. 1, and the belt tension characteristics that correspond to the maps.

FIG. 9A shows the motor drive signal characteristics of an embodiment, wherein the horizontal axis indicates time (units: msec), and the vertical axis indicates the motor drive signal. FIG. 9B shows a belt tension characteristic curve Ts3 that indicates the change in the belt tension Btr according to the motor drive signal characteristics shown in FIG. 9A. In FIG. 9B, the horizontal axis indicates time (units: msec), and the vertical axis indicates the belt tension Btr.

The motor drive signal shown in FIG. 9A has control characteristics whereby a forward rotation pulse (drive current pulse) and a backward rotation pulse (drive current pulse) are issued in alternating fashion to the electric motor 37 beginning at the signal generation start time t1. The forward rotation pulses are square pulses for causing the electric motor 37 to rotate (forward rotation) only in the direction in which the seat belt 31 is retracted by the pretensioner 36. The backward rotation pulses are square pulses for causing the electric motor 37 to rotate (backward rotation) only in the direction (withdrawal direction) in which the seat belt 31 is unwound from the pretensioner 36.

More specifically, in a single drive cycle of the motor drive signal, a forward rotation pulse having pulse width t21 is generated, after which the signal rests for an extremely brief inter-pulse time t22, and then a backward rotation pulse having pulse width t23 is generated. The duration of this drive cycle is t24. The motor drive signal also has a rest cycle in which no pulses are generated subsequent to the drive cycle. The duration of this rest cycle is t25.

For example, the pulse width t21 of the forward rotation pulses is 100 msec, the inter-pulse time t22 is 10 msec, the pulse width t23 of the backward rotation pulses is 50 msec, the duration t24 of the drive cycles is 160 msec, and the duration t25 of the rest cycles is 150 msec.

The motor drive signal thus has so-called intermittent control characteristics whereby there is a repeated alternation between drive cycles and rest cycles.

The electric motor 37 repeats the sequence of forward rotation (rotation in the belt retraction direction), backward rotation (rotation in the belt unwinding direction), and rest. The belt tension Btr of the seat belt 31 increases each time that the electric motor 37 rotates in the belt retraction direction, and the belt tension Btr of the seat belt 31 decreases each time that the electric motor 37 rotates in the belt unwinding direction. These effects are shown in FIG. 9B.

Figure 9B:
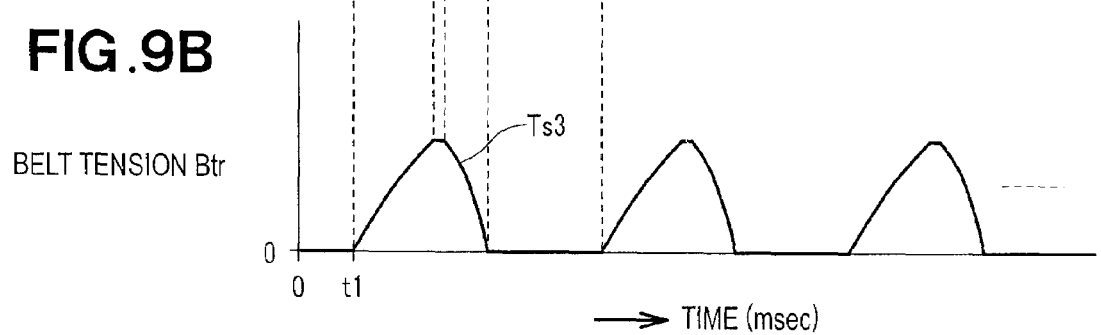

As shown in FIGS. 9A and 9B, the belt tension Btr of the seat belt 31 increases each time a forward rotation pulse is generated, is maintained at its current value when there is no forward rotation pulse or backward rotation pulse, and decreases each time a backward rotation pulse is generated.

There is therefore a repeated alternation between an increase in the belt tension Btr due to the retraction of the seat belt 31, a holding of the belt tension Btr due to the retraction of the seat belt 31 being stopped, and a decrease in the belt tension Btr due to the unwinding of the seat belt 31. As a result, the seat belt 31 vibrates. This vibration can be used to alert and call the attention of the occupant Ma to a predicted emergency condition.

As is apparent from the above description, the motor drive signal characteristics shown in FIG. 9A have control characteristics whereby the electric motor 37 repeatedly alternates between forward rotation, stoppage, and backward rotation. In the present invention, the motor drive signal characteristics shown in FIG. 9A are utilized as the "third motor control map Me3" executed by the control unit 41.

Figure 9C:
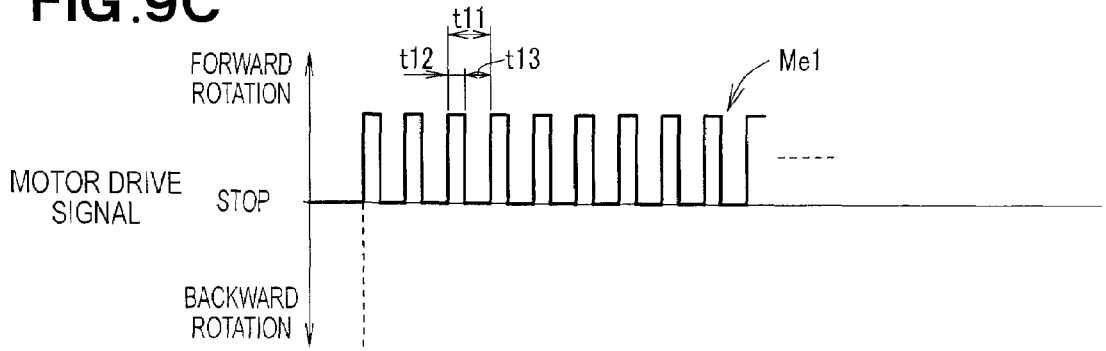
Figure 9D:
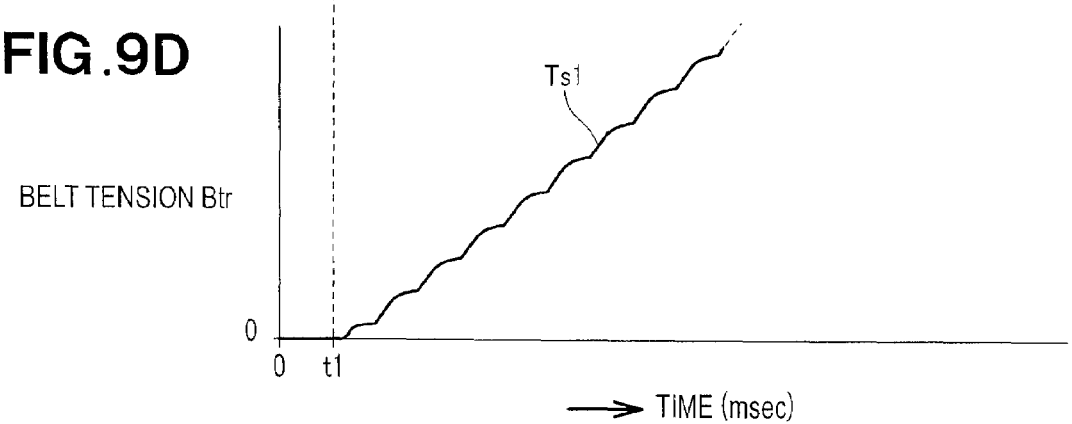

The third motor control map Me3 will be contrasted herein with the first motor control map Me1 shown in FIG. 6A. The first motor control map Me1 shown in FIG. 6A is transcribed into FIG. 9C. The belt tension characteristic curve Ts1 shown in FIG. 6C is transcribed into FIG. 9D. FIG. 9C corresponds to FIG. 9A, and FIG. 9D corresponds to FIG. 9B.

The control characteristics of the third motor control map Me3 shown in FIG. 9A differ from the control characteristics of the first motor control map Me1 shown in FIG. 9C with respect to the intermittent time characteristic and the rotation direction characteristic of the electric motor 37. Therefore, the third motor control map Me3 will be described as another drive control mode, i.e., a "second drive control mode Me3" that differs from the abovementioned "first drive control mode Me1." Since the drive control mode is different, the belt tension characteristic of the belt tension characteristic curve Ts3 shown in FIG. 9B differs from that of the belt tension characteristic curve Ts1 shown in FIG. 9D.

Figure 4:
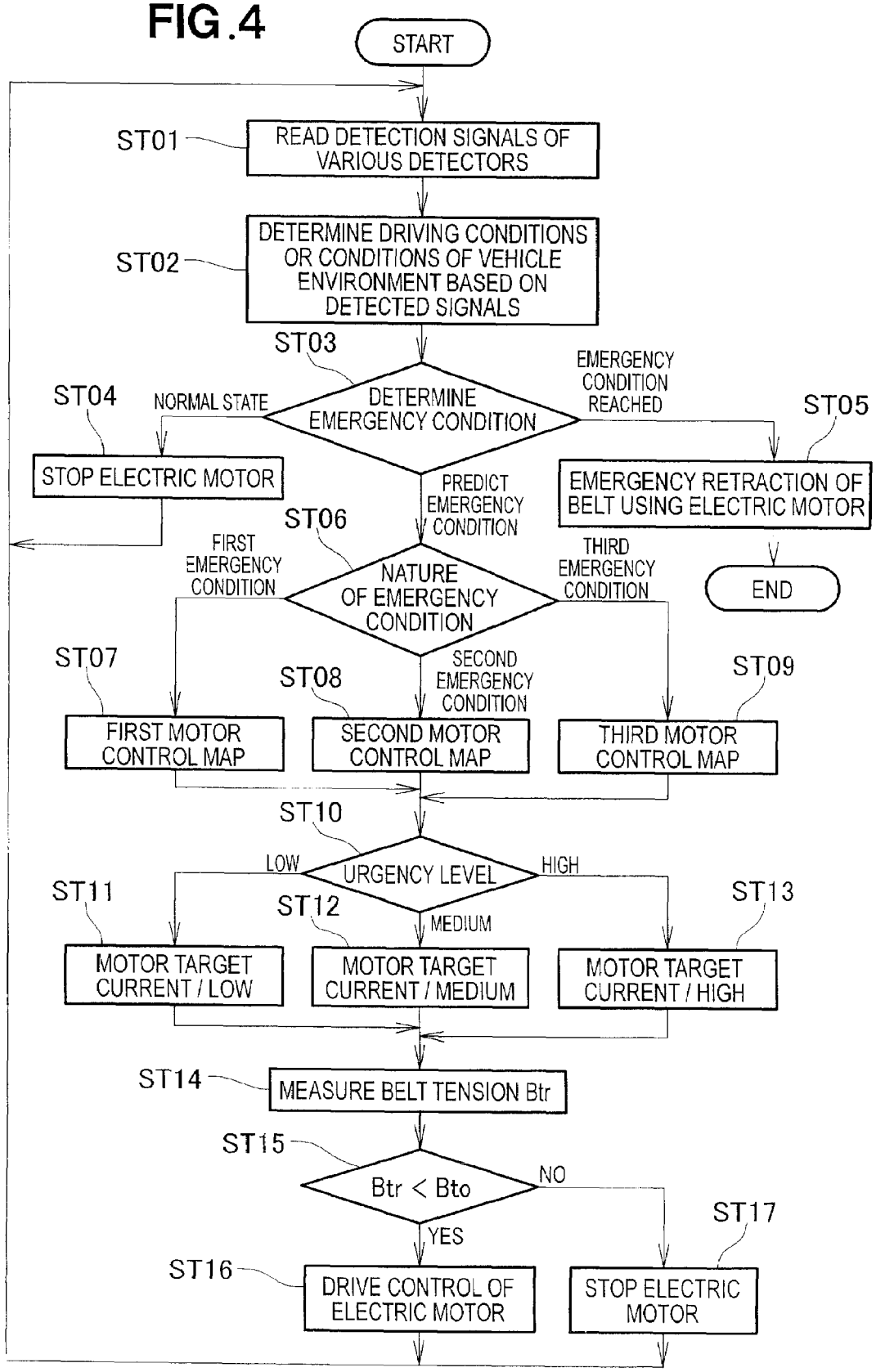
FIG. 4 is a flowchart of the control performed by a control unit shown in FIG. 1.

In the control flowchart shown in FIG. 4, the first motor control map Me1 is selected in ST07, the second motor control map Me2 is selected in ST08, and the third motor control map Me3 is selected in ST09.

In ST16, the driving of the electric motor 37 is controlled according to the control characteristics of a map selected from the three motor control maps Me1, Me2, and Me3. The control is performed based on the target current in accordance with the urgency of the emergency. The drive torque generated by the electric motor 37 is large when the target current is large.

The second and third second motor control maps Me2 and Me3 may have control characteristics in which at least one characteristic selected from the intermittent time characteristic, the drive torque characteristic, and the rotation direction characteristic of the electric motor 37 differs with respect to that of the control characteristics of the first motor control map Me1.

The above description is summarized as follows.

When an emergency condition for the vehicle 10 is predicted (ST03 in FIG. 4), the control unit 41 selects (ST06 through ST09 in FIG. 4) one drive control mode that corresponds to the predicted emergency condition from among the first drive control mode Me1 (first motor control map Me1 in FIG. 6) and the second drive control modes Me2, Me3 (second and third motor control maps Me2, Me3 in FIGS. 8 and 9), and the driving of the electric motor 37 is controlled (ST16 in FIG. 4) based on the selected drive control mode.

When the first drive control mode Me1 is selected, the electric motor 37 can be continuously rotated in the belt retraction direction and caused to repeatedly alternate between low-speed rotation (including rotation at an extremely low speed) and high-speed rotation when an emergency condition for the vehicle 10 is predicted. This results in variation of the degree to which the belt tension Btr is increased by retraction, and the seat belt 31 therefore vibrates. This vibration can be used to alert and call the attention of the occupant Ma to a predicted emergency condition.

When the second drive control modes Me2, Me3 are selected, the electric motor 37 can be driven according to operating characteristics that differ from the control characteristics of the first drive control mode. The electric motor 37 is operated according to different characteristics, and a difference is therefore created in the pattern of the seat belt 31 vibration or in the restraining force of the seat belt 31 that is felt by the occupant himself.

Since the operating characteristics of the electric motor can be varied according to the nature of the predicted emergency condition, the occupant can be rapidly and reliably notified of the nature of the predicted emergency condition.

Since the control unit 41 controls (ST10 through ST13 shown in FIG. 4) the driving of the electric motor 37 so that the drive torque generated by the electric motor 37 is increased in direct proportion to the urgency of the predicted emergency, the strength of the vibration of the seat belt 31 can be varied accordingly. As a result, it is possible to clearly notify the occupant Ma of the urgency of an emergency by increasing the restraining force of the seat belt 31 on the occupant Ma according to the urgency of the predicted emergency. The occupant Ma can therefore more appropriately recognize the urgency of the emergency and respond accordingly.

Figure 10A:
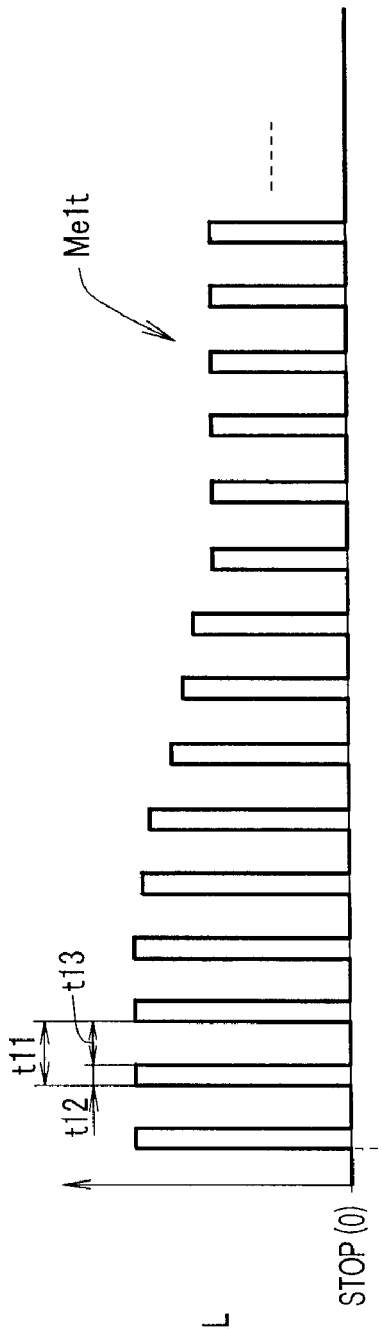
FIG. 10 is a view showing a modified example of the first motor control map shown in FIG. 6, and the belt tension characteristic that corresponds to the map.

The first motor control map Me1 shown in FIG. 6A may have the control characteristics of the modified example shown in FIG. 10A.

Figure 10B:
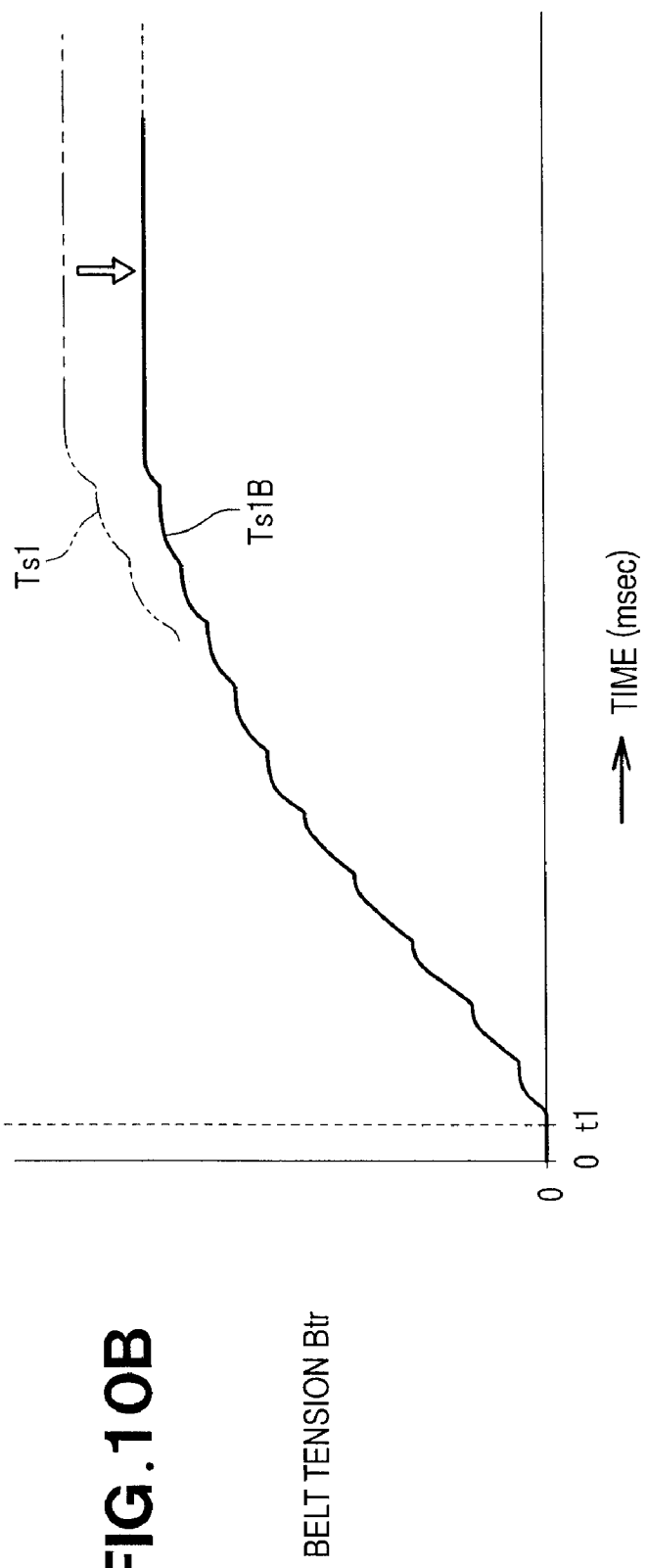

FIG. 10A shows the motor drive signal characteristics of a modified example, wherein the horizontal axis indicates time (units: msec), and the vertical axis indicates the motor drive signal. FIG. 10B shows a belt tension characteristic curve Ts1b of the modified example that indicates the change in the belt tension Btr according to the motor drive signal characteristics shown in FIG. 10A. In FIG. 10B, the horizontal axis indicates time (units: msec), and the vertical axis indicates the belt tension Btr.

As shown in FIG. 10A, the forward rotation pulses of the modified example have substantially the same waveform as the forward rotation pulses shown in FIG. 6A. In other words, the motor drive signal characteristics shown in FIG. 10A have control characteristics whereby the electric motor 37 repeatedly alternates between low-speed rotation and high-speed rotation. Therefore, the motor drive signal characteristics shown in FIG. 10A are utilized as the "first motor control map Me1t" of the modified example. In the modified example, the first motor control map Me1t of the modified example may be selected instead of the "first motor control map Me1t" in ST07 of the control flowchart shown in FIG. 4.

However, a characteristic feature of the first motor control map Me1t of the modified example is that the size of the forward rotation pulses, i.e., the drive current for driving the electric motor 37, is reduced over time after the signal generation start time t1.

The belt tension Btr generally increases as indicated by the imaginary line in FIG. 10B as retraction of the seat belt 31 by the pretensioner 36 progresses. The resistance to retraction of the belt by the pretensioner 36 also increases as the belt tension Btr increases. The belt tension Btr ultimately increases to a tension that counterbalances the drive torque of the electric motor 37. This belt tension Btr increases in stages each time the retraction operation of the electric motor 37 is repeated, and the increase in each stage is relatively large. When the increase in the belt tension Btr is excessively large, the occupant Ma may feel that the increase in the restraining force of the seat belt 31 is too large.

In contrast, the control unit 41 of the modified example utilizes the "first motor control map Me1t" of the modified example that is shown in FIG. 10A. In other words, the control unit 41 controls the driving of the electric motor 37 so as to reduce the drive torque over time after the signal generation start time t1. According to the modified example, the drive torque of the electric motor 37 gradually decreases over time. Therefore, the degree to which the belt tension Btr increases each time the electric motor 37 repeats the retraction operation also gradually decreases. As a result, there is also a gradual decrease in the amount of increase of the restraining force of the seat belt 31 that is felt by the occupant Ma himself. A belt vibration that is more suitable to the occupant Ma can be created by gradually reducing the degree to which the restraining force is increased. It is therefore possible to reliably call the attention of the occupant Ma while even more effectively preserving the comfort of the occupant Ma.

The first motor control map Me1t of the modified example can be described as a "first drive control mode Me1t of a modified example" that has control characteristics for causing the electric motor 37 to rotate in only the belt retraction direction and repeatedly alternate between low-speed rotation and high-speed rotation.

In the present invention, the vehicle seat belt device 30 may have a configuration in which a seat belt 31 and related members are provided to at least one of a plurality of seats. For example, the seat belt 31 and related members may be provided to only the driver's seat and adjoining front passenger seat, or may also be provided to a rear seat.

The vehicle seat belt device 30 of the present invention is suitable for a structure in which an electric motor 37 is provided to a pretensioner 36 for retracting the loose portion of a seat belt 31 during an emergency.

Obviously, various minor changes and modifications of the present invention are possible in light of the above teaching. It is therefore to be understood that within the scope of the appended claims the invention may be practice otherwise than as specifically described.

What is claimed is:

1. A vehicle seat belt device comprising:
   a seat belt for restraining an occupant seated in a seat of a vehicle;
   a pretensioner for retracting a loose portion of the seat belt during an emergency;
   an electric motor for driving the pretensioner; and a control unit for controlling the electric motor, wherein the control unit performs control for causing the electric motor to continuously rotate only in a belt retraction direction and repeatedly alternate between low-speed rotation and high-speed rotation when an emergency condition of the vehicle is predicted.

2. The device of claim 1, wherein the control unit controls the electric motor such that a drive torque generated by the electric motor increases in direct proportion to the urgency of the predicted emergency condition.

3. The device of claim 1, wherein the control unit controls the electric motor such that a drive torque generated by the electric motor decreases over time after repetitive control of the electric motor is initiated.

4. A vehicle seat belt device comprising:
a seat belt for restraining an occupant seated in a seat of a vehicle;
a pretensioner for retracting a loose portion of the seat belt during an emergency;
an electric motor for driving the pretensioner; and
a control unit for controlling the electric motor, wherein, when an emergency condition of the vehicle is predicted, the control unit selects a mode that corresponds to a nature of the predicted emergency condition from among a plurality of drive control modes for controlling the electric motor at the time of prediction, and controls the electric motor based on the selected mode; and the plurality of drive control modes comprise:

a first drive control mode having control characteristics whereby the electric motor is controlled so as to continuously rotate only in a belt retraction direction and repeatedly alternate between low-speed rotation and high-speed rotation; and a second drive control mode having characteristics in which at least one of characteristics of the electric motor that include a repetition time characteristic, a drive torque characteristic, and a rotational direction characteristic differs from the control characteristics of the first drive control modes.

* * * * *